United States Patent
Lee et al.

(10) Patent No.: US 9,263,953 B2
(45) Date of Patent: Feb. 16, 2016

(54) POWER SUPPLY APPARATUS FOR SUPPLYING INTERNAL POWER FROM A MINIMUM INPUT VOLTAGE TO A STEADY STATE OF AN OUTPUT OF A BOOST STAGE

(71) Applicant: SAMSUNG ELECTRO-MECHANICS CO., LTD., Gyeonggi-Do (KR)

(72) Inventors: Jeong Nam Lee, Seoul (KR); Yeon Ho Jeong, Seoul (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/503,654

(22) Filed: Oct. 1, 2014

(65) Prior Publication Data

US 2015/0092463 A1 Apr. 2, 2015

(30) Foreign Application Priority Data

Oct. 1, 2013 (KR) .................. 10-2013-0117338

(51) Int. Cl.
*H02M 5/42* (2006.01)
*H02M 3/335* (2006.01)
*H02M 1/42* (2007.01)
*H02M 1/00* (2007.01)

(52) U.S. Cl.
CPC ............ *H02M 3/335* (2013.01); *H02M 1/4225* (2013.01); *H02M 2001/0006* (2013.01); *H02M 2001/007* (2013.01)

(58) Field of Classification Search
CPC ............ H02M 3/1584; H02M 1/4225; H02M 2003/1586; Y02B 70/126
USPC .................................... 363/108, 89
See application file for complete search history.

(56) References Cited

U.S. PATENT DOCUMENTS

| 7,161,307 | B2 * | 1/2007 | Chen ........................... 315/247 |
| 2009/0279331 | A1 * | 11/2009 | Young ................ H02M 3/3376 363/84 |
| 2012/0056548 | A1 * | 3/2012 | Duan et al. ............... 315/200 R |
| 2012/0063174 | A1 * | 3/2012 | Kuwabara .......... H02M 1/4225 363/21.02 |
| 2013/0020872 | A1 * | 1/2013 | Kinnard ................ H02J 9/061 307/64 |

* cited by examiner

FOREIGN PATENT DOCUMENTS

JP 2012-029363 A 2/2012
KR 10-2003-0008855 A 1/2003

*Primary Examiner* — Jessica Han
*Assistant Examiner* — Lorena Bruner
(74) *Attorney, Agent, or Firm* — Bracewell & Giuliani LLP; Brad Y. Chin

(57) ABSTRACT

Embodiments of the invention provide a power supply apparatus, including an AC/DC rectifying unit converting an AC voltage into a DC voltage, a power factor correction unit correcting a power factor of the DC voltage, and a DC/DC conversion unit converting the DC voltage having the corrected power factor into a DC voltage having a different magnitude therefrom. According to various embodiments, the power supply apparatus further includes an auxiliary winding connected to a primary side winding of a transformer of the DC/DC conversion unit and generating the DC voltage having a predetermined magnitude, and an internal power generation unit connected to an output terminal of the power factor correction unit and the auxiliary winding and using a voltage of the output terminal of the power factor correction unit and a voltage generated by the auxiliary winding to generate temporary Vcc power and supply the generated temporary Vcc power as internal power of the power factor correction unit.

9 Claims, 2 Drawing Sheets

POWER SUPPLY APPARATUS FOR SUPPLYING INTERNAL POWER FROM A MINIMUM INPUT VOLTAGE TO A STEADY STATE OF AN OUTPUT OF A BOOST STAGE

CROSS REFERENCE TO RELATED APPLICATION

This application claims the benefit of and priority under 35 U.S.C. §119 to Korean Patent Application No. KR 10-2013-0117338, entitled "POWER SUPPLY APPARATUS," filed on Oct. 1, 2013, which is hereby incorporated by reference in its entirety into this application.

BACKGROUND

1. Field of the Invention

The present invention relates to a power supply apparatus, and more particularly, to a power supply apparatus capable of stably supplying internal power within a wide range from a minimum input voltage to a steady state of an output of a boost stage.

2. Description of the Related Art

In the case of a general AC-DC power supply apparatus, a latter stage of an AC-DC rectifying unit is mainly provided with a two-stage configuration of a power factor correction (PFC) unit and a DC-DC conversion unit. Recently, a type of implementing a single-stage in which functions of the PFC unit and the DC-DC conversion unit are integrated into one for high power density has been mainly used but has power factor and efficiency lower than those of a type of implementing a two-stage, and therefore is restrictively used in products. Further, in the two-stage configuration, as the PFC unit, a boost converter has been widely used and as the DC-DC conversion unit, a flyback converter, a full-bridge converter, and an inductor-inductor-capacitor (LLC) resonant converter have been widely used. The flyback converter has low efficiency but is advantageous in multi-output generation using a transformer, as compared with the LLC resonant converter. The full-bridge converter may not be used for products having low power density due to a larger number of devices and may have reduced efficiency at the time of a light load. For this reason, the LLC resonant converter, which may have high efficiency with a smaller number of devices, has been mainly used. However, the LLC resonant converter has a narrow input range with respect to a supply of internal power, and thus may not generate the internal power at a minimum input voltage like the flyback converter.

Meanwhile, in the two-stage power supply apparatus configured of the boost converter and the LLC resonant converter, the related art, which generates the internal power may largely include the following two methods.

The first method uses an additional standby stage at the outside. The method supplies the internal power from an output of the AC-DC rectifying unit (bridge diode) through the additional standby stage and therefore may achieve a stable operation. In this case, the standby stage generally uses the flyback converter. The method may be used in the case in which the use of the standby stage is essential and the case in which the required power density is low and may not be used due to a spatial disadvantage in the case in which the high power density is required.

The second method is a method of generating internal power from an output of the PFC unit through a regulator. The second method is a method of applying a voltage regulator to an output of a PFC unit to constantly supply internal power at all times within a wide range from a minimum input voltage to a boost steady output at least three times as large as an input voltage and may increase costs and the overall size of the apparatus since a loss of the output voltage of the PFC unit normally operated is large and the available regulator also needs to use a product having a large voltage threshold.

SUMMARY

Accordingly, embodiments of the invention have been made to provide a power supply apparatus capable of stably supplying internal power within a wide range from a minimum input voltage to a steady state of an output of a boost stage using an additional winding (auxiliary winding), which is connected to an output terminal of a PFC unit and a DC/DC conversion unit.

According to at least one embodiment of the invention, there is provided a power supply apparatus, including an AC/DC rectifying unit converting an AC voltage into a DC voltage, a power factor correction unit correcting a power factor of the DC voltage, and a DC/DC conversion unit converting the DC voltage having the corrected power factor into a DC voltage having a different magnitude therefrom. According to various embodiments, the power supply apparatus further includes an auxiliary winding connected to a primary side winding of a transformer of the DC/DC conversion unit and generating the DC voltage having a predetermined magnitude, and an internal power generation unit connected to an output terminal of the power factor correction unit and the auxiliary winding and using a voltage of the output terminal of the power factor correction unit and a voltage generated by the auxiliary winding to generate temporary Vcc power and supply the generated temporary Vcc power as internal power of the power factor correction unit.

According to at least one embodiment, the internal power generation unit includes a Vcc power circuit unit generating the temporary Vcc power by dividing an output voltage of the power factor correction unit using a plurality of resistors, a Vcc_DC/DC connection unit connecting the voltage generated by the auxiliary winding to the temporary Vcc power, and a Vcc voltage change unit changing a magnitude of the voltage generated by the Vcc power circuit unit.

According to at least one embodiment, the Vcc power circuit unit is configured as a serial connection circuit of a first resistor and a second resistor, which divide the output voltage of the power factor correction unit to generate the temporary Vcc power.

According to at least one embodiment the Vcc_DC/DC connection unit is configured to include a diode of which the cathode is connected to a common connection node of the first resistor and the second resistor of the Vcc power circuit unit.

According to at least one embodiment, the Vcc voltage change unit is configured to include a third resistor having one terminal connected to the common connection node of the first resistor and the second resistor of the Vcc power circuit unit and a switch device having a drain connected to the other terminal of the third resistor, a source connected to a ground, and a gate applied with the voltage generated by the auxiliary winding.

According to at least one embodiment, the switch device is an NMOS.

According to another embodiment of the invention, the Vcc voltage change unit is configured to include a third resistor having one terminal connected to a common connection node of the first resistor and the second resistor of the Vcc power circuit unit, a switch device having a drain connected to the other terminal of the third resistor and a source connected to a ground, and an operating amplifier having an output terminal connected to the gate of the switch device and amplifying and outputting the output voltage of the power factor correction unit input through the input terminal when the output voltage is larger than a preset voltage.

According to at least one embodiment, the switch device is an NMOS.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
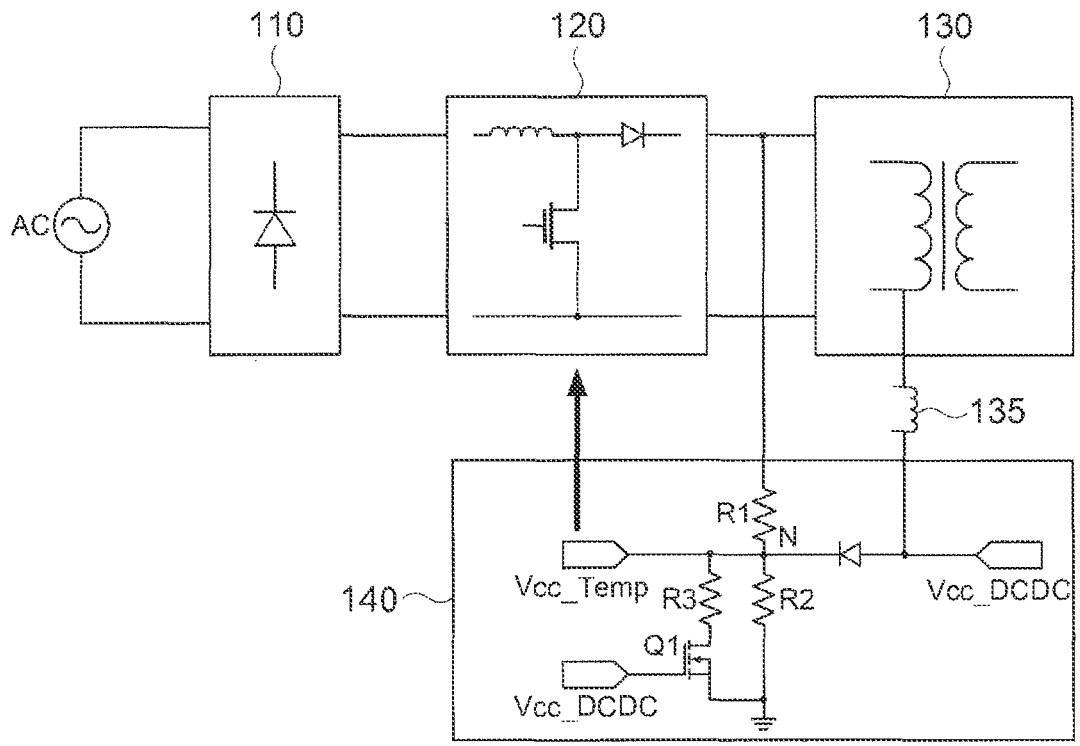
FIG. 1 is a diagram schematically illustrating a configuration of a power supply apparatus according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

FIG. 1 is a diagram schematically illustrating a configuration of a power supply apparatus according to an embodiment of the invention.

Referring to FIG. 1, the power supply apparatus according to an embodiment of the invention is configured to include an AC/DC rectifying unit or rectifier 110, a power factor correction unit or corrector 120, a DC/DC conversion unit or converter 130, an auxiliary winding 135, and an internal power generation unit or generator 140.

According to at least one embodiment, the AC/DC rectifying unit 110 is applied with an AC voltage from the outside and converts and outputs the applied AC voltage into a DC voltage. As the AC/DC rectifying unit 110, a full-bridge diode or a half-bridge diode, or the like may be used.

According to at least one embodiment, the power factor correction unit 120 corrects a power factor of the DC voltage, which is converted by the AC/DC rectifying unit 110. The power factor correction unit 120 is configured as a serial-parallel combination circuit of an inductor, a diode and a switching device and in some case, is further added with a capacitor.

According to at least one embodiment, the DC/DC conversion unit 130 converts the DC voltage having the power factor corrected by the power factor correction unit 120 into a DC voltage having a different magnitude therefrom. As the DC/DC conversion unit 130, a transformer may be used.

According to at least one embodiment, the auxiliary winding 135 is connected to a primary side winding of the transformer of the DC/DC conversion unit 130 and generates a DC voltage having a predetermined magnitude. According to at least one embodiment, the auxiliary winding 135 is to generate the internal power.

According to at least one embodiment, the internal power generation unit 140 is connected to an output terminal of the power factor correction unit 120 and the auxiliary winding 135 and generates temporary Vcc power Vcc_Temp using a voltage PFC_output (see FIG. 2) of the output terminal of the power factor correction unit 120 and a voltage Vcc_DCDC generated by the auxiliary winding 135 and supplies the generated temporary Vcc power Vcc_Temp as the internal power of the power factor correction unit 120.

Figure 2:
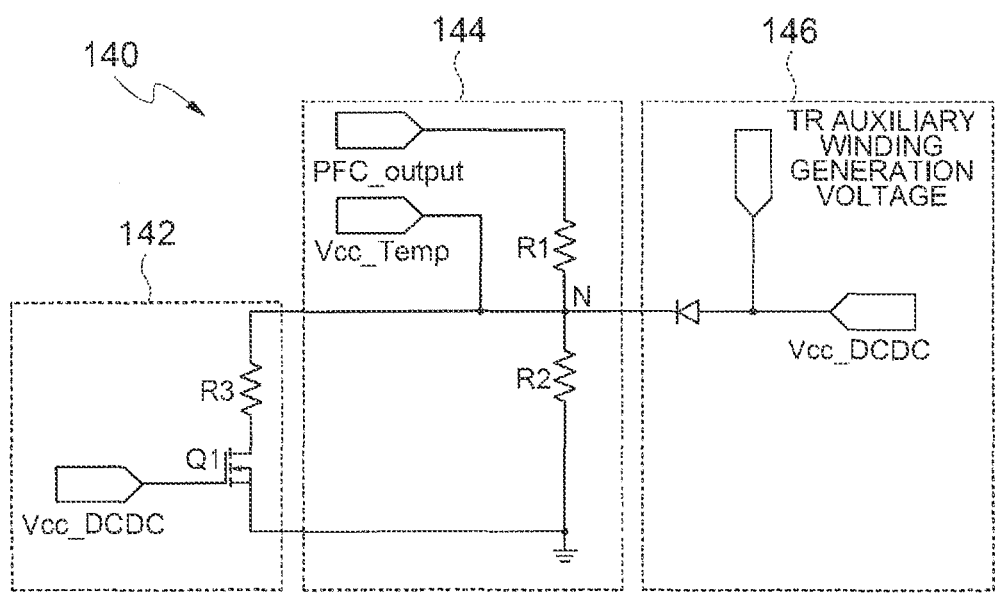
FIG. 2 is a diagram illustrating in detail internal circuits of an internal power generation unit of the power supply apparatus of FIG. 1 for each function according to an embodiment of the invention.

According to at least one embodiment, the internal power generation unit 140 is configured to include a Vcc power circuit unit 144, a Vcc_DC/DC connection unit 146, and a Vcc voltage change unit 142 as illustrated in FIG. 2.

According to at least one embodiment, the Vcc power circuit unit 144 generates the temporary Vcc power Vcc_Temp by dividing the output voltage PFC_output of the power factor correction unit 120 using a plurality of resistors R1 and R2. According to at least one embodiment, the Vcc power circuit unit 144 is configured as a serial connection circuit of the first resistor R1 and the second resistor R2, which divide the output voltage PFC_output of the power factor correction unit 120 to generate the temporary Vcc power Vcc_Temp. In this case, resistance values of the first resistor R1 and the second resistor R2 are set based on the minimum input power of the power supply apparatus and a voltage value of the desired internal power.

According to at least one embodiment, the Vcc_DC/DC connection unit 146 connects the voltage Vcc_DCDC generated by the auxiliary winding 135 to the temporary Vcc power Vcc_Temp. The Vcc_DC/DC connection unit 146 is configured to include a diode of which the cathode is connected to a common connection ode N of the first resistor R1 and the second resistor R2 of the Vcc power circuit unit 144.

According to at least one embodiment, the Vcc voltage change unit 142 changes a magnitude of the voltage generated by the Vcc power circuit unit 144. The Vcc voltage change unit 142 is configured to include a third resistor R3 having one terminal connected to the common connection node N of the first resistor R1 and the second resistor R2 of the Vcc power circuit unit 144 and an NMOS as a switch device Q1 having a drain connected to the other terminal of the third resistor R3, a source connected to a ground, and a gate applied with the voltage Vcc_DCDC generated by the auxiliary winding 135.

Figure 3:
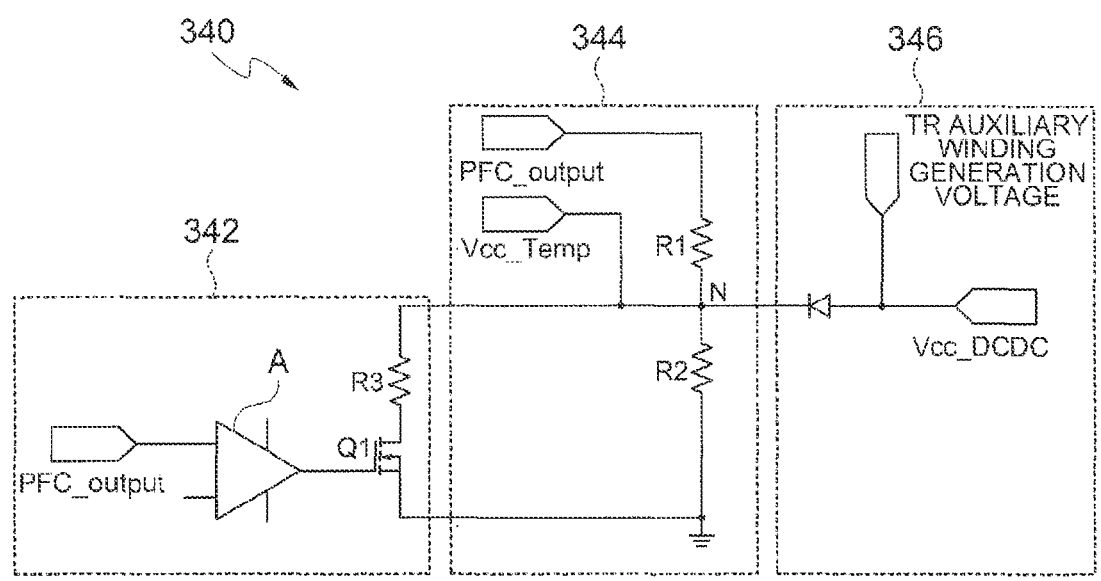
FIG. 3 is a diagram illustrating an internal power generation unit of a power supply apparatus according to another embodiment of the invention.

Meanwhile, FIG. 3 is a diagram illustrating an internal power generation unit of a power supply apparatus according to another embodiment of the invention.

Referring to FIG. 3, an internal power generation unit 340 according to another embodiment of the invention has the same basic configuration as the internal power generation unit 140 illustrated in FIG. 2, However, the internal power generation unit 340 and the internal power generation unit 140 have a slight difference in a configuration of a Vcc voltage change unit 342. Therefore, the description of the Vcc power circuit unit 344 and the Vcc_DC/DC connection unit 346, which correspond to the Vcc power circuit unit 144 and the Vcc_DC/DC connection unit 146 of the internal power generation unit 140 illustrated in FIG. 2, will be omitted and only the Vcc voltage change unit 342 will be described.

According to at least one embodiment, the Vcc voltage change unit 342 is configured to include a third resistor R3 having one terminal connected to a common connection node N of a first resistor R1 and a second resistor R2 of the Vcc power circuit unit 344, an NMOS Q1 as a switch device having a drain connected to the other terminal of the third resistor R3 and a source connected to a ground, and an operating amplifier A having an output terminal connected to the gate of the MOOS Q1 and amplifying and outputting the output voltage PFC_output of the power factor correction unit 120 input through the input terminal when the output voltage is larger than a preset voltage (for example, 2.5 V).

Next, an operation of the power supply apparatus according to various embodiments of the invention having the above configuration will be briefly described with reference to FIGS. 1 and 2.

According to at least one embodiment, when the AC/DC rectifying unit 110 is applied with the AC voltage (for example, AC 220V) from the outside and converts and outputs the AC voltage into the DC voltage, the power factor correction unit 120 is applied with the output voltage of the AC/DC rectifying unit 110 to output the voltage of which the power factor is corrected and the DC/DC conversion unit 130 converts the DC voltage having the power factor corrected by the power factor correction unit 120 into DC voltage (for example, DC 24V, DC 12V, as non-limiting examples) having different magnitudes depending on a turn ratio of primary and secondary windings.

In a series of processes as described above, the internal power generation unit 140 uses the voltage PFC_output of the output terminal of the power factor correction unit 120 and the voltage Vcc_DCDC generated by the auxiliary winding 135 to generate the temporary Vcc power Vcc_Temp and supply the generated Vcc power Vcc_Temp as the internal power of the power factor correction unit 120. That is, the internal power generation unit 140 divides the voltage PFC_output of the output terminal of the power factor correction unit 120 into a voltage ratio depending on the resistance values of the first resistor R1 and the second resistor R2 to generate the temporary Vcc power Vcc_Temp and primarily supply the internal power to the power factor correction unit 120 side at the temporary Vcc power Vcc_Temp. Next, when the power factor correction unit 120 (boost stage) and the DC/DC conversion unit 130 are normally operated, the "Vcc_DCDC", which is the voltage generated through the auxiliary winding 135 of the transformer of the DC/DC conversion unit 130 is transferred through the diode of the Vcc_DC/DC connection unit 146 to supply the internal power along with the temporary Vcc power Vcc_Temp. In this process, when the Vcc_DCDC is equal to or more than a conduction voltage of the switch device Q1 of the Vcc voltage change unit 142, the switch device Q1 is conducted and the third resistor R3 of the Vcc voltage change unit 142 and the second resistor R2 of the Vcc power circuit unit 144 have a parallel connection structure, such that the Vcc_Temp voltage which is the temporary Vcc power is reduced. In this case, a resistance value of the third resistor R3 needs to be set to be a value smaller than that of the second resistor R2. The internal power is supplied from both of the Vcc_temp terminal and the Vcc_DCDC terminal but power is little supplied from the Vcc_temp terminal reduced due to the operation of the switch device Q1 and the third resistor R3 of the Vcc voltage change unit 142. Therefore, no loss due to the first and second resistors R1 and R2 is present.

Meanwhile, as illustrated in FIG. 3, a conduction time of the switch device Q1 of the Vcc voltage change unit 142 may also be controlled by sensing the voltage PFC_output of the output terminal of the power factor correction unit 120 with the operating amplifier A.

As described above, the power supply apparatus according to various embodiments of the invention uses the voltage of the output terminal of the PFC unit and the voltage generated by the additional winding (auxiliary winding) connected to the DC/DC conversion unit to generate the internal power and supplies the internal power as the power inside the system, thereby stably supplying the internal power over the wide range from the minimum input voltage to the steady state of the output of the boost stage (power factor correction unit).

Further, according to at least one embodiment, the space is easily secured since the smaller number of devices is used and the high efficiency is obtained since the loss at the steady operation is reduced.

As described above, according to various embodiments of the invention, the internal power is stably supplied over the wide range from the minimum input voltage to the steady state of the output of the boost stage (power factor correction unit), the space is easily secured since the smaller number of devices is used, and the high efficiency is obtained since the loss at the steady operation is reduced.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in Which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A power supply apparatus, comprising:
    an AC/DC rectifying unit converting an AC voltage into a DC voltage;
    a power factor correction unit correcting a power factor of the DC voltage converted by the AC/DC rectifying unit;
    a DC/DC conversion unit converting the DC voltage having the power factor corrected by the power factor correction unit into a DC voltage having a different magnitude therefrom;
    an auxiliary winding connected to a primary side winding of a transformer of the DC/DC conversion unit connected to an output side of the power factor correction unit and generating a DC voltage having a predetermined magnitude; and
    an internal power generation unit connected to an output terminal of the power factor correction unit and the auxiliary winding and using a voltage of the output terminal of the power factor correction unit and a voltage generated by the auxiliary winding to generate temporary Vcc power and supply the generated temporary Vcc power to the power factor correction unit as internal power of the power factor correction unit.

2. The power supply apparatus according to claim 1, wherein the internal power generation unit comprises:
    a Vcc power circuit unit generating the temporary Vcc power by dividing an output voltage of the power factor correction unit using a plurality of resistors;
    a Vcc_DC/DC connection unit connecting the voltage generated by the auxiliary winding to the temporary Vcc power; and
    a Vcc voltage change unit changing a magnitude of the voltage generated by the Vcc power circuit unit.

3. The power supply apparatus according to claim 2, wherein the Vcc power circuit unit is configured as a serial connection circuit of a first resistor and a second resistor which divide the output voltage of the power factor correction unit to generate the temporary Vcc power.

4. The power supply apparatus according to claim 3, wherein resistance values of the first resistor and the second resistor are set based on minimum input power of the power supply apparatus and a voltage value of the internal power to be set.

5. The power supply apparatus according to claim 3, wherein the Vcc_DC/DC connection unit is configured to include a diode of which a cathode is connected to a common connection node of the first resistor and the second resistor of the Vcc power circuit unit.

6. The power supply apparatus according to claim 3, wherein the Vcc voltage change unit is configured to include a third resistor having one terminal connected to a common connection node of the first resistor and the second resistor of the Vcc power circuit unit and a switch device having a drain connected to the other terminal of the third resistor, a source connected to a ground, and a gate applied with the voltage generated by the auxiliary winding.

7. The power supply apparatus according to claim 6, wherein the switch device is an NMOS.

8. The power supply apparatus according to claim 3, wherein the Vcc voltage change unit is configured to include a third resistor having one terminal connected to a common connection node of the first resistor and the second resistor of the Vcc power circuit unit, a switch device having a drain connected to the other terminal of the third resistor and a source connected to a ground, and an operating amplifier having an output terminal connected to a gate of the switch device and amplifying and outputting the output voltage of the power factor correction unit input through an input terminal when the output voltage is larger than a preset voltage.

9. The power supply apparatus according to claim 8, wherein the switch device is an NMOS.

* * * * *